United States Patent [19]

den Hollander

[11] 4,179,642

[45] Dec. 18, 1979

[54] RASTER CORRECTION CIRCUIT WITH LOW DISSIPATION RESISTIVE DAMPING

[75] Inventor: Willem den Hollander, Schlieren, Switzerland

[73] Assignee: RCA Corporation, New York, N.Y.

[21] Appl. No.: 885,203

[22] Filed: Mar. 10, 1978

[30] Foreign Application Priority Data

Sep. 2, 1977 [GB] United Kingdom ............... 36792/77

[51] Int. Cl.$^2$ .......................................... H01J 29/56
[52] U.S. Cl. ............................................. 315/370
[58] Field of Search ............................... 315/371, 370

[56] References Cited

U.S. PATENT DOCUMENTS

| 3,447,027 | 5/1969 | Kramer | 315/370 |
| 3,628,082 | 12/1971 | Dietz | 315/370 X |
| 3,760,222 | 9/1973 | Smith | 315/371 |
| 3,819,979 | 6/1974 | Truskalo | 315/370 X |
| 3,962,602 | 6/1976 | Dietz | 315/371 X |
| 4,063,133 | 12/1977 | Nero et al. | 315/370 |

*Primary Examiner*—Malcolm F. Hubler
*Attorney, Agent, or Firm*—Eugene M. Whitacre; Paul J. Rasmussen; William H. Meise

[57] ABSTRACT

A kinescope deflection arrangement includes a deflection winding driven by a deflection generator. A pincushion correction circuit includes a switchable impedance coupled in series with the deflection winding. A portion of the retrace voltage pulse appears across the switchable impedance. A transformer has a primary winding coupled to the output of the deflection generator, and a secondary winding on which a sample of the retrace pulse appears. A pincushion correction circuit damping resistor is coupled between the transformer secondary winding and the impedance.

6 Claims, 2 Drawing Figures

RASTER CORRECTION CIRCUIT WITH LOW DISSIPATION RESISTIVE DAMPING

BACKGROUND OF THE INVENTION

This invention relates to a pincushion correction circuit which is useful in a television apparatus.

A side or East-West pincushion correction apparatus is described in U.S. Pat. No. 4,088,931 issued May 9, 1978 in the name of Peter E. Haferl entitled, "PINCUSHION CORRECTION CIRCUIT", in which an impedance network is coupled in series with the horizontal deflection coil. A switch is coupled in parallel with the impedance. The switch is operated during the second half of the horizontal retrace interval at times which are progressively advanced and retarded during each cycle of the vertical deflection. The average impedance in series with the horizontal deflection coil is thereby varied at a vertical deflection rate in such a manner as to correct for horizontal or side pincushion distortion. A damping circuit consisting of a resistor is coupled between a point on the impedance network and ground in order to minimize the effect of switching transients and thereby prevent undesirable oscillations in the switched impedance. The resistor may dissipate substantial amounts of power.

In the aforementioned arrangement, pincushion correction is achieved by controlling the amount of energy or current in the deflection winding at the beginning of the trace interval. This in turn is accomplished by controlling the impedance in series with the deflection winding during the second half of the retrace interval. When the average impedance is high, less current tends to flow in the deflection winding and the horizontal trace width is reduced. When the average impedance is low, more current flows in the deflection winding and the trace width increases. The average impedance in series with the deflection winding is controlled by the relative time at which the switch is closed. A smooth, continuously variable pincushion correction requires that the voltage waveform across the impedance network follow the waveform of the retrace pulse without transient voltages or undamped oscillations. Such transient voltages or oscillations cause the pincushion correction to vary in a manner not continuously related to the time at which the switch is closed.

The amount of power dissipated in the pincushion circuit damping resistor as described in the aforementioned Haferl application may be somewhat reduced by coupling the damping resistor directly across the switch. This has the advantage that horizontal deflection signals do not appear across the damping resistor except during the horizontal retrace interval, resulting in reduced power dissipation.

The power dissipation of the damping circuit can be almost completely eliminated by a second controllable switch coupling the pincushion distortion control impedance to a reference voltage source, as described in copending application Ser. No. 821,784 filed Aug. 4, 1977, in the name of Willem den Hollander. A particularly advantageous embodiment of this arrangement uses a diode as the controllable switch, and a sample of the retrace voltage from a deflection transformer as both the switch control voltage and the reference voltage source.

While the aforementioned den Hollander damping circuit has very low power dissipation, it may not be possible to use the diode switch arrangement in all applications, as where a well-defined switching voltage is not available from the deflection transformer, or where direct voltages associated with the transformer winding perturb diode switching, or where the horizontal output transformer also provides isolation of the receiver chassis from the alternating power lines. For those damping applications in which the switched damping circuit is not used, lower power dissipation than that provided by the Haferl arrangement may be desirable.

SUMMARY OF THE INVENTION

A kinescope deflection arrangement including a kinescope deflection winding and deflection current generating means for promoting the flow of deflection current in the winding produces retrace voltage pulses at the winding. A raster distortion correction arrangement includes a variable impedance coupled in circuit with the deflection winding in such a manner that at least a portion of the retrace voltage pulses appear thereacross. A second source of pulses produces voltage pulses in synchronism with the retrace pulses. A dissipative impedance is coupled to the second source and to the variable impedance for attenuating undesired signals appearing across the variable impedance.

DESCRIPTION OF THE INVENTION

Figure 1:
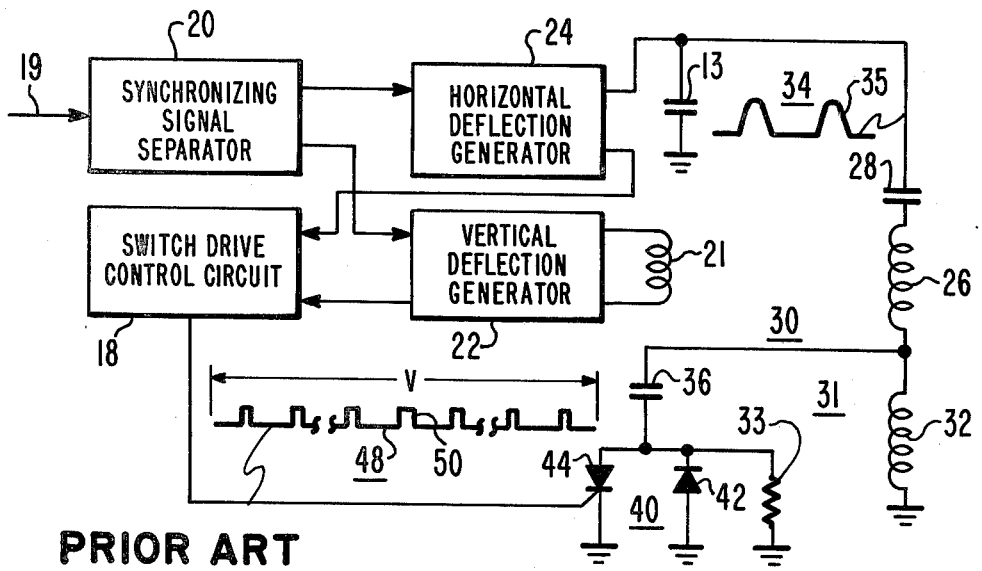
FIG. 1 is a diagram, partially in block and partially in schematic form of a portion of a television receiver embodying a prior art switched pincushion correction circuit.

FIG. 1 shows the deflection system of a television receiver including a synchronizing signal separator 20 which receives composite video signals at an input terminal 19 from a video detector, not shown. Separator 20 separates vertical synchronizing signals from the composite video and applies them to an input terminal of a vertical deflection generator 22. Vertical deflection generator 22 uses the vertical synchronizing signals to synchronize the generation of a vertical deflection current for application to a vertical deflection winding 21 associated with a kinescope, not shown. Synchronizing signal separator 20 also separates horizontal synchronizing signals from the composite video and applies them to an input terminal of a horizontal deflection generator 24. Horizontal generator 24 processes the horizontal synchronizing signals to produce a sawtooth current through a horizontal deflection winding 26. "S" shaping of the horizontal deflection current is produced by a capacitor 28 coupled in series with horizontal deflection coil 26. A retrace capacitor 13 is connected between the output of the horizontal deflection generator and ground. A horizontal scanning rate voltage represented as waveform 34 having retrace pulses 35 appears across the horizontal deflection winding 26, "S" capacitor 28 and a series connected pincushion correction circuit designated generally as 30. Pincushion correction circuit 30 includes a controllable switch indicated generally as 40 coupled with an impedance network designated as 31, which includes an inductance 32 and capacitor 36. Switch 40 includes a thyristor 44 and an antiparallel coupled diode 42. A damping resistor 33 is coupled across switch 40. It should be noted that the aforementioned U.S. application Ser. No. 722,600 describes use of a transformer in place of inductor 32. The use of an inductor as shown in FIG. 1 decreases the peak voltage occurring across switch 40, but is otherwise functionally equivalent to a transformer.

A switch drive control circuit 18 has inputs coupled to the vertical and horizontal deflection generators and produces a repetitive gating sequence represented as 48 of gating pulses 50, each of which pulses occurs during the second half of the horizontal retrace interval. The trailing edge of individual pulses 50 of pulse sequence 48 occur at the time of termination of the retrace pulse. At the beginning of each repetitive sequence 48, corresponding to the top of the vertical scan, the leading edge of each pulse 50 occurs immediately prior to the trailing edge so that the pulses 50 are short in duration. Pulses 50 occurring after the beginning of vertical scan but before the center of the vertical scan interval have leading edges which are progressively advanced in time relative to the trailing edge. At the center of vertical scan, corresponding to the middle of the sequence of pulses 48, the leading edges of the individual pulses 50 approach the time of the center of the retrace pulses 35. From the center of the sequence 48 of pulses to the end of each sequence, which correspond to the middle and the bottom of vertical scan, respectively, the leading edges of the pulses 50 are progressively retarded relative to the time of center of retrace, until at bottom of vertical scan maximum retardation of the leading edge occurs, and the duration of a pulse 50 is again short.

The progressively advanced closure time of switch 40 during the first half of the vertical scan interval progressively reduces the average impedance in series with deflection winding 26, with the result that the energy stored in deflection winding 26 in the form of current at the beginning of the horizontal trace interval is progressively increased. Similarly, during the second half of the vertical scan interval, the progressive delay in the closure time of switch 40 during the second half of the horizontal retrace interval progressively increases the average impedance in series with deflection winding 26, so that the energy stored at the beginning of the horizontal trace interval progressively decreases towards the end of the vertical scan interval, thereby providing side pincushion correction. Switch 40 remains closed during the horizontal trace interval, and a resonant current flows in the circuit including winding 32, capacitor 36 and switch 40. At the end of each horizontal trace interval, switch 40 is opened by a reversal of the current then flowing through diode 42, with thyristor 44 not enabled for conduction by gating sequence 48.

As mentioned, in the absence of damping as by resistor 33, oscillations can occur in impedance network 31 during the time that switch 40 is open as a result of switching transients or other causes. These may cause the voltage appearing across impedance network 31 to have uncontrolled fluctuations, rather than smoothly following the retrace voltage. For example, the voltage appearing across pincushion correction circuit 30 of FIG. 1 should be a fraction of the retrace voltage 35, depending upon the magnitude of impedance network 31 relative to the impedance of deflection winding 26 and capacitor 28.

Figure 2:
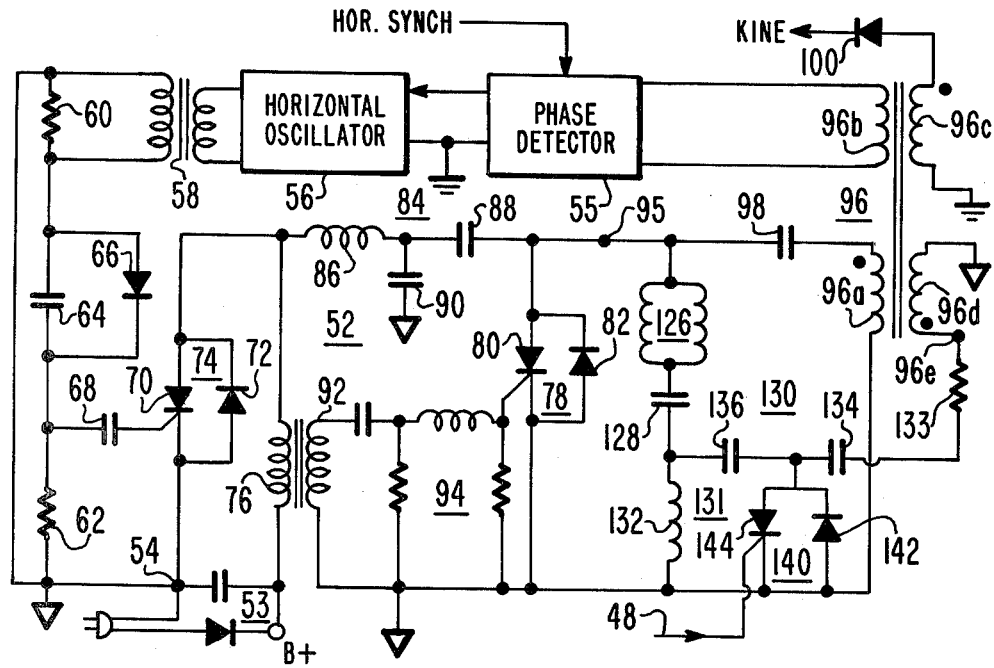
FIG. 2 shows, partially in block and partially in schematic form a portion of a television receiver embodying the invention.

FIG. 2 shows a diagram, partially in block and partially in schematic form, of a horizontal deflection generator such as that described in U.S. Pat. No. 3,452,244 as an example of a generator 24 of FIG. 1, together with a switched pincushion correction circuit embodying the invention. In FIG. 2, a horizontal deflection generator designated generally as 52 receives direct voltage designated as B+ from a rectifier and filter designated generally as 53. Horizontal generator 52 and rectifier and filter 53 are directly connected to one side 54 of the alternating-current power line (called "ground 54" hereinafter), as indicated by the triangular ground reference symbol.

Synchronizing signals for horizontal generator 52 are controlled by a phase detector 55 having an input coupled to receive horizontal synchronizing pulses from a source such as synchronizing signal separator 20 of FIG. 1. An output of phase detector 55 is coupled to the input of a horizontal oscillator 56 which produces pulses at the horizontal deflection rate. The horizontal rate pulses produced by oscillator 56 are coupled through an isolation transformer 58 to a waveshaping network including resistors 60 and 62, a capacitor 64 and diode 66. The horizontal-rate pulses appearing across resistor 62 are coupled through a capacitor 68 to the gate of a thyristor 70. Thyristor 70 together with antiparallel coupled diode 72 forms a commutating switch designated generally as 74. Commutating switch 74 has one end connected to ground 54. The other end of switch 74 is connected through a relatively large-valued input inductor 76 to B+, the source of operating potential. Another bidirectional switch designated generally as 78 includes a thyristor 80 and antiparallel-connected diode 82. One end of switch 78 is coupled to ground 54. A terminal 95 at the other end of switch 78 is coupled to the junction of bidirectional switch 74 and input inductor 76 by means of a commutating circuit designated generally as 84. Commutating network 84 includes a commutating inductor 86 coupled in series with a commutating capacitor 88, and an auxiliary capacitor 90 coupled from their junction to ground 54. A winding 92 is magnetically coupled to input inductor 76. A waveshaping network designated generally as 94 couples winding 92 to the gate of trace thyristor 80.

A transformer 96 provides galvanic isolation between those portions of horizontal deflection circuit 52 connected to the alternating-current power line and the remainder of the television receiver. Those portions of the receiver isolated from the power line are identifiable by conventional ground symbols, representing use of the chassis as reference.

Primary winding 96a of transformer 96 is serially coupled with a blocking capacitor 98 between ground 54 and terminal 95. A secondary winding 96b of transformer 96 is coupled to an input of phase detector 55 to provide a time reference thereto, and a high-voltage winding 96c has one end coupled to chassis ground and the other coupled to an ultor voltage rectifier represented by diode 100. Transformer 96 also has a further auxiliary secondary winding 96d which is coupled to ground 54 and to those portions of the television receiver circuitry requiring retrace pulses, such as the pincushion switch drive control circuit illustrated as 18 in FIG. 1.

A horizontal deflection winding designated generally as 126 is coupled in parallel with trace switch 78 by the series combination of an S-shaping capacitor 128 and inductor 132.

Inductor 132 is part of an impedance network 131 of a pincushion correction circuit designated generally as 130. Pincushion correction circuit 130 also includes a bidirectional switch designated generally as 140 and including antiparallel coupled thyristor 144 and diode 142. One end of switch 140 is coupled to ground 54, and the other end is coupled by a capacitor 136 to the junction of capacitor 128 and inductor 132. Similar to the arrangement in FIG. 1, switch 40 is controlled by recurrent gating pulse sequences 48 applied to thyristor 144 from a pincushion switch drive control circuit, not shown. A damping resistor 133 is coupled by a capacitor 134 to the junction of capacitor 136 and switch 140 and to a terminal 96e at one end of auxiliary secondary winding 96d.

The operation of horizontal deflection circuit 52 is described in detail in U.S. Pat. No. 3,452,244. A brief description of the operation is, however, included here. During the second half of the horizontal trace interval, thyristor 80 is conducting the deflection current and the primary current of transformer 96. This current is increasing with time due to the energy stored as voltage on capacitors 98 and 128. A relatively large voltage is stored on commutating capacitor 88 and auxiliary capacitor 90, and commutating switch 74 is open. Before the end of the horizontal trace interval, horizontal oscillator 56 produces a pulse which gates commutating switch 74 into conduction. This closes a resonant path including commutating circuit 84, commutating switch 74 and trace switch 78. Current builds up in this resonant path until it equals and exceeds the combined deflection and output transformer primary current. Thyristor 80 thereupon opens and diode 82 becomes conductive to carry the excess of the resonant current over the deflection and transformer primary current. The resonant current flow through commutating circuit 84 and switches 74 and 78 then decreases, diode 82 becomes nonconductive and switch 78 opens. This begins the retrace interval. During retrace, the voltage at terminal 95 and across commutating capacitors 88 and 90 increases to a peak as the current in the resonant circuit including commutating circuit 84, switch 74, deflection winding 126 and primary 96a flows through capacitors 88 and 90. The current then reverses so that diode 72 in commutating switch 74 carries the current. Current increases in the deflection winding and primary of transformer 96 as the voltage on the commutating capacitors decreases. As the voltage across the trace switch reaches zero, diode 82 becomes conductive to end the retrace interval and begin the trace interval. Energy stored as current in the deflection winding charges the S capacitor with a linearly decreasing scanning current during the first half of trace.

Pincushion correction circuit 130 operates generally in conjuction with the deflection winding as does pincushion correction circuit 30 of FIG. 1. In the absence of damping, oscillations can occur on the crest of that portion of the retrace voltage appearing across switch 140 and impedance network 131. The voltage waveform across the impedance network and switch 140 should exactly follow the waveform of the retrace pulse appearing at terminal 95, albeit at a lower amplitude, for otherwise a continuous variation of the time at which switch 140 is gated into conduction during the retrace interval will not give a corresponding variation of the horizontal deflection amplitude.

Damping resistor 133 has a resistance low enough so that, if it were coupled between impedance network 131 and ground 54 or other reference voltage point, transient voltages or oscillations occurring in impedance circuit 131 when switch 140 is open would be substantially damped. However, this low value of resistance would cause a substantial current conduction in resistor 133 attributable to that portion of the retrace pulse appearing across the resistor. In order to reduce the retrace energy dissipated in resistor 133, it is coupled as shown to terminal 96e of winding 96d, which acts as a source of reference voltage which tracks that portion of the retrace voltage which appears across switch 140 when the switch is nonconductive. Ideally, the reference voltage at terminal 96e should exactly track that portion of the retrace voltage appearing across switch 140, in which case no current attributable to the retrace voltage would flow in resistor 133, and there would be no power dissipation other than that of the unwanted oscillations. In practice, however, the retrace voltage appearing at terminal 96e may be established by the requirements of other circuits to which the terminal is coupled, or by considerations of transformer cost. A power saving will result as compared with the arrangement of FIG. 1 for tracking reference voltages greater or less than that portion of the retrace voltage appearing across switch 140, so long as the difference voltage appearing across damping resistor 133 is less than that portion of the retrace voltage appearing across switch 140.

The reduction in power dissipation in the damping resistor is enhanced by capacitor 134. The relatively larger impedance of capacitor 134 at low frequencies and lower impedance at high frequencies selectively allowing damping current to flow in resistor 133 for relatively higher-frequency unwanted oscllations to a greater degree than the relatively lower-frequency retrace and trace-intervalcomponents of the deflection voltage.

It will be apparent to those skilled in the art that the damping resistance may be included in the internal impedance of winding 96d, and that many of the various sources of retrace pulses which exist in television receivers may be used in place of winding 96d. Also, the damping resistor may be coupled to other locations in and about impedance network 131, as the situation may require, without departing from the scope of the invention.

What is claimed is:

1. A kinescope deflection arrangement, comprising:
   a deflection winding;
   deflection current generating means coupled with said deflection winding for promoting the flow of current therethrough, said deflection current generator also producing retrace voltage pulses at said winding;
   raster distortion correction means, said correction means comprising variable impedance means serially coupled with said deflection winding, a portion of said retrace voltage pulses appearing across said impedance means;
   a second source of voltage pulses in synchronism with said retrace pulses; and
   resistance means coupled between said second source and said impedance means for attenuating transient voltages appearing across said impedance means.

2. A deflection arrangement according to claim 1, further comprising filter means coupled with said resistance means for attenuating the flow of currents in said resistance means in a particular frequency band.

3. A deflection arrangement according to claim 2, wherein said filter means has ahigh-pass characteristic for allowing the flow of current in said resistance means of voltages having relatively high frequency components more than those having relatively low frequency components.

4. A deflection arrangement according to claim 2, wherein said filter means comprises capacitance means serially coupled with said resistance means for allowing greater current flow in said resistance means for transient voltages having relatively high frequency components by, comparison with the relatively low-frequency components of said deflection current.

5. A raster distortion correction arrangement for a kinescope deflection circuit, comprising:

a deflection winding;

deflection current generating means coupled to said deflection winding for promoting the flow of deflection current therein and for generating recurrent retrace voltage pulses at a first deflection rate;

raster distortion correction means, said correction means comprising impedance means coupled in circuit with said deflection winding, at least a portion of said retrace voltage pulses appearing across said impedance means, said impedance means being subject to transient voltages which perturb the operation of said raster distortion correction means;

a second source of voltage pulses in substantial tracking relation to said retrace voltage pulses; and resistance means coupled with said second source and with said impedance means for damping said transient voltages appearing across said impedance means.

6. A raster distortion correction arrangement for a kinescope deflection circuit, comprising:

a deflection winding;

deflection current generating means coupled to said deflection winding for promoting the recurrent flow ofdeflection current therein at a first rate, and for generating voltage pulses during recurrent deflection current retrace intervals at a terminal thereof;

switchable impedance means coupled with said deflection winding and operated at times during said retrace intervals which are progressively varied at a second kinescope scanning rate for correcting raster distortion, said switchable impedance means undesirably being subject to transient voltages; and resistance means coupled at one end with said terminal and at the other end with said switchable impedance means for damping said transient voltages.

* * * * *